United States Patent [19]
Glennon

[11] 3,887,820
[45] June 3, 1975

[54] PARALLELING CONTROL FOR PHASE SYNCHRONIZED GENERATORS

[75] Inventor: Timothy F. Glennon, Rockford, Ill.

[73] Assignee: Sunstrand Corporation, Rockford, Ill.

[22] Filed: Mar. 29, 1974

[21] Appl. No.: 456,310

[52] U.S. Cl. ............................................. 307/87
[51] Int. Cl. ........................................ H03k 5/20
[58] Field of Search .......... 307/87, 86, 85, 57, 129; 317/26, 147; 321/4, 6

[56] References Cited
UNITED STATES PATENTS
3,436,647  4/1969  Gobeli et al. ................. 307/87 X Primary Examiner—Herman Hohauser
Attorney, Agent, or Firm—Wegner, Stellman, McCord, Wiles & Wood

[57] ABSTRACT

An electrical power generation and distribution system with two alternating current generators each powered by a variable speed engine through a constant speed drive. Each generator has a constant speed drive control with a phase comparator and a summing integrator to maintain phase synchronism with a reference signal. The generators are connected in parallel with each other or with an external power source, through switches actuated by the output of the phase comparator. The switches are closed only when the alternating signals are in substantial phase synchronism, minimizing switching transients.

12 Claims, 3 Drawing Figures

PARALLELING CONTROL FOR PHASE SYNCHRONIZED GENERATORS

BACKGROUND OF THE INVENTION

Electrical power generation and distribution systems utilizing plural parallel connected independently driven and controlled generators or other power sources are known. For example, it is common on large aircraft for generators to be driven by each of the engines and the outputs of the generators to be selectively connected in parallel to supply the various aircraft loads. The engines of an aircraft operate at differing speeds depending on flight conditions and other variables. In order that the alternating frequency of the generators be stabilized for proper operation of the loads and to enable satisfactory parallel operation, a constant speed drive is interposed between each engine and the associated generator. A frequency control, such as that of Erickson et al. U.S. Pat. No. 3,064,189, compares the generator frequency with that of a reference or standard and develops an electrical signal utilized to control the drive to maintain a constant output speed. Aircraft also have provision for the introduction of power from an auxiliary source, as from an external power system when the aircraft is on the ground. Paralleling controls previously used in generator paralleling systems have compared the phases of the signals and initiated closing the paralleling switches when the phases are substantially the same. Such prior systems have not, however, utilized phase control of the constant speed drive. Closure of the switches requires a finite time during which the phases of the power signal change. If the phases of the waveforms differ at the time paralleling switches close, transient currents occur which may disrupt the operation of the loads.

SUMMARY OF THE INVENTION

The present invention is concerned with a paralleling control for power sources where the generator is controlled to synchronize its phase with that of a reference signal. The phase of the generator is compared with the phase of the reference signal and the output of the phase comparator is connected with a summing integrator, the output of which is a DC signal with an amplitude representing the cumulative angle of phase difference between the generator output and the reference and the polarity indicating whether the generator output leads or lags. The signal at the output of the summing integrator is used to control the variable speed drive for the generator. Only when the generator and reference are in substantial phase synchronism is the switch connecting the generator output in parallel with another source closed. Thus, excessive transients are avoided.

One feature of the invention is the provision of a paralleling control for first and second electrical power sources including a source of reference signal having a phase that corresponds with that of one of the sources, means for comparing the phase of the output of the first source generator with that of the second source to develop an instantaneous phase difference signal, means for developing a cumulative phase difference signal which controls the drive to the first source generator and further means responsive to the source phase difference for closing a switch which connects the sources in parallel, only when the phase difference is within selected limits.

Another feature is that the paralleling switch actuating means is responsive to one or both of the instantaneous or cumulative phase difference signals.

A further feature is that one of the sources is an external power source and that the reference signal for the other source is derived from the external power source.

Still a further feature is the provision of a power generation and distribution system having plural sources, at least two of which are generators powered through controllable drives, with phase controls operative to synchronize the cumulative phase of the generators with a reference. An appropriate reference signal is selected depending on the connections of the power sources to the distribution system.

Yet another feature is the provision of means for selecting a single reference signal for each phase comparator, following paralleling of the sources.

Further features and advantages of the invention will readily be apparent from the following specification, and from the drawings, in which.

Figure 1:
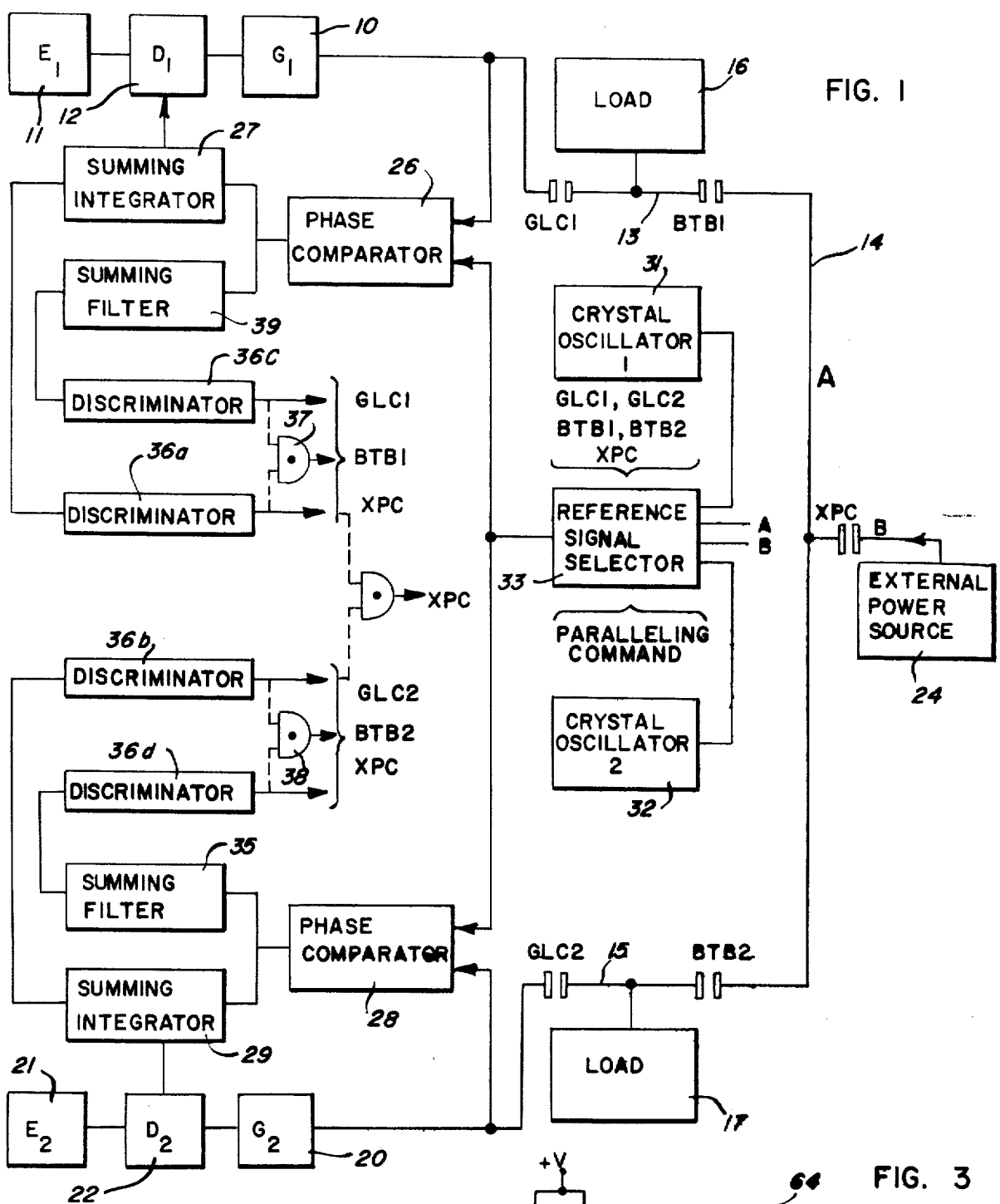
FIG. 1 is a block diagram of an electrical power generation and distribution system embodying the invention.

The block diagram, FIG. 1, illustrates the invention as incorporated in a typical aircraft electrical system having two-engine driven generators with provision for a power input from an external power source, as a ground power connection, used to avoid the necessity for operating the aircraft engines when the plane is on the ground. A first power source includes a generator (G1) 10 driven by an engine (E1) 11 through a constant speed drive (D1) 12. An electrical distribution network is illustrated diagramatically at 13, 14, 15 and has loads 16 and 17 connected therewith. A second power source includes a generator (G2) 20 driven by engine (E2) 21 through drive (D2) 22. The output of generator G1 is connected with the distribution network 13 through generator line contactor GLC1. Similarly the output of generator G2 is connected with the distribution network 15 through contactor GLC2. Loads 16 and 17 may be connected together through line 14 and bus tie breakers BTB1 and BTB2.

A third (external) power source 24 is connected with line 14 of the distribution system through an external power contactor XPC.

In the diagram of FIG. 1, the outputs of the power sources and the electrical distribution network are indicated by single lines. Commonly, three phase systems are used. Illustration of all the wires and contacts would be unnecessarily complex. Each single line represents the three conductors of the three phase distribution system and the single contact switches GLC, BTB and XPC represent the three contacts of a three phase system.

Figure 2:
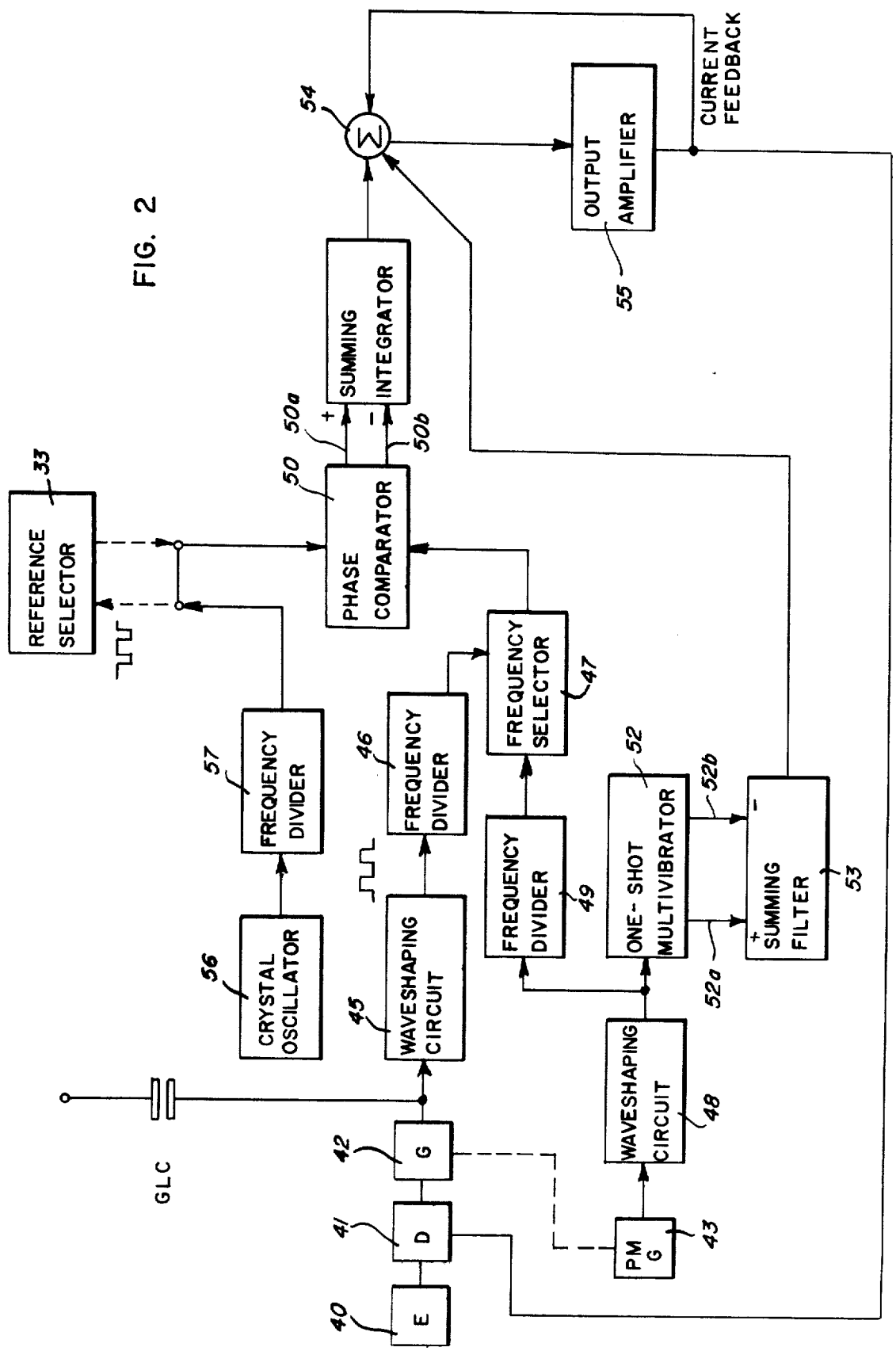
FIG. 2 is a block diagram of a generator phase control utilized in the system of FIG. 1.

In a representative system engines E1, E2, designated 11 and 21 in FIG. 1, operate at varying speeds. Drives D1, D2, identified as 12 and 22, mechanically convert the variable speed input of the engines to a constant speed output which drives the generators G1, G2, identified as 10 and 20. An electrical input to the drives D1, D2 controls the drive operation to maintain the desired frequency and phase synchronism. Typical aircraft electrical generators operate at 400 Hertz. The controls for the two generators are essentially the same and only that for generator G1 will be described in detail. In FIG. 1 only the phase synchronizing control is shown. Further details of the circuit and the frequency control are shown in FIG. 2.

The output of generator G1 is connected with a phase comparator 26 where the signal phase is compared with that of a phase reference signal. The source of the reference signal will be discussed below. For present consideration, it is sufficient that the signal have a stable phase at the desired generator frequency. The output of the phase comparator represents any difference in instantaneous phase between the output of generator G1 and the reference signal and is connected with a summing integrator 27, the output of which is an analog DC signal with an amplitude which represents the cumulative angle of phase difference between the output of generator G1 and the reference signal and a polarity which indicates whether the generator phase leads or lags the reference phase. The cumulative phase difference signal from the summing integrator is connected with constant speed drive D1 to phase synchronize the operation of generator G1 with the reference signal. In a representative generating system a phase error of less than ±20° is maintained over a wide range of engine speeds and generator loads.

cally, in a typical system a crystal controlled oscillator 31 is associated with generator G1 and a crystal controlled oscillator 32 is associated with generator G2. A reference signal selector circuit 33 has as inputs the signals from the first and second crystal oscillators 31, 32 and from points A and B of the power distribution network, the point A representing the line between the external power contactor XPC and bus tie breakers BTB, and the point B representing the circuit associated with the third or external power source 24 outside external power contactor XPC. The alternating current phase reference signals are preferably square waves at the frequency of the power sources or a subharmonic thereof.

Circuits for deriving square wave signals from sine waves are well known and are not illustrated in detail.

Reference signal selector 33 has control inputs representing the condition of the various distribution system interconnecting switches GLC1, GLC2, BTB1, BTB2 and XPC, and a paralleling command input providing for instruction by an operator regarding the power source to be connected to the distribution network.

Table 1 below indicates graphically the various initial conditions and paralleling commands which are possible in the system of FIG. 1 and the selection of the phase reference signal for the paralleling operation.

TABLE 1

| | | Initial Condition | | | | | | | | |
|---|---|---|---|---|---|---|---|---|---|---|
| XPC | 0 | 1 | 0 | 1 | 0 | 1 | 0 | 1 | "0" | indicates either switch is open |
| GLC1 and/or BTB1 | 0 | 0 | 1 | 1 | 0 | 0 | 1 | 1 | "1" | indicates both switches are closed |
| GLC2 and/or BTB2 | 0 | 0 | 0 | 0 | 1 | 1 | 1 | 1 | | |

| Signal applied to Source 1 and 2 | | Ref. Signal | | | | | Paralleling Command |
|---|---|---|---|---|---|---|---|
| | A | | * | * | * | * | Close XPC (presumes voltage at point B) |
| | B | | | | | | |
| | Crystal | 1 | | | | | |
| | Crystal | 2 | | | | | |
| Source 1 | A | | * | | * | * | |
| | B | | | | | | Close GLC1 or BTB1 |
| | Crystal | 1 | * | | | | |
| | Crystal | 2 | | | | | |
| Source 2 | A | | * | * | * | | |
| | B | | | | | | Close CLC2 or BTB2 |
| | Crystal | 1 | | | | | |
| | Crystal | 2 | * | | | | |

The phase of generator G2 is controlled in a comparable manner through a circuit including phase comparator 28 and summing integrator 29.

The paralleling control for operating the appropriate switches to interconnect two or more sources in parallel provides for closing the various switches GLC, BTB or XPC, interconnecting the power sources with loads 16 and 17 as desired. The switches may be electromechanical relays, with operating circuits which are well known and are not illustrated in detail. An appropriate phase reference signal is selected in accordance with the power sources already connected with the distribution system and the power source which is to be connected by operation of the paralleling control.

Either common or separate alternating current phase reference sources are provided for the controllable power sources, generators G1 and G2. More specifi-

TABLE 2

| | | Operating Condition | | | | | | | |
|---|---|---|---|---|---|---|---|---|---|
| XPC | 0 | 1 | 0 | 1 | | 0 | 1 | 0 | 1 |
| GLC1 and/or BTB1 | 0 | 0 | 1 | 1 | | 0 | 0 | 1 | 1 |
| GLC2 and/or BTB2 | 0 | 0 | 0 | 0 | | 1 | 1 | 1 | 1 |

| Signal applied to Source 1 | | | | | | | | | |
|---|---|---|---|---|---|---|---|---|---|
| | A | | | | | | | | |
| | B | | * | * | | * | * | | |
| | Crystal | 1 | * | | * | | | * | |
| | Crystal | 2 | | | | | | | |
| Source 2 | A | | | | | | | | |
| | B | | * | * | | * | * | | |
| | Crystal | 1 | | | | | | * | |
| | Crystal | 2 | * | | * | | * | | |

Examples will illustrate the uses of the table in determining which reference signal will be selected for the phase comparators. Assume that GLC1 and BTB1 are closed. This condition is found in the third of the eight columns of the table. It is desired to close XPC to connect an external power source with the system. This function is indicated in the upper third of the table. The asterisk in colulmn 3 indicates that the reference signal from point B is selected. Similarly, if the initial condition is that GLC2 is closed and the command is to close GLC1, bringing generator 1 into parallel operation with generator 2, the fifth column of the table shows that the reference is selected from point A. The logic circuitry of selector 33 for implementing the selections illustrated in the table 1 is not shown in detail.

The closing of the paralleling switches is initiated when the difference in phase between the output of the controlled generator and the reference signal is within desired limits. The phase difference condition can be determined in several different ways.

The outputs of summing integrators 27, 29 represents the cumulative phase difference between the controlled generator and the reference source over any time period, limited only by the summing integrator capacity, as will appear. The outputs of the phase comparators 26, 28 are also connected with summing filters 34, 35 having finite time constants, the outputs of which effectively represent the instantaneous rather than the cumulative phase difference. The outputs of the summing integrators on the summing filter are DC signals of varying amplitude depending on the phase difference between the controlled generator and the reference.

Amplitude discriminators 36a, 36b, 36c and 36d are connected respectively with the outputs of summing integrators 27, 29 and summing filters 34, 35. When the amplitude of the signal at the input of a discriminator is within desired limits, the discriminator has an output which is utilized to control the closing of the appropriate switches, as indicated. The outputs of discriminators 36a, 36c may be utilized independently to control the closing of contacts GLC1, BTB1 and XPC. Alternatively, the outputs of the two discriminators may be connected through AND gate 37 to control these contacts. Similarly, the outputs of discriminators 36b, 36d may be utilized to control the closing of contacts GLC2 and BTB2, either independently or collectively through AND gate 38.

Closure of XPC is effected by outputs from one or both of phase comparators 26, 28 depending on the initial condition of the system. If only the first power source was connected, an output phase comparator 26 is utilized. If only the second power source was in operation, an output from phase comparator 28 controls XPC. Either the cumulative or the instantaneous phase signal may be utilized as described above. These circuits may be completed through logic networks which are not shown. If both the first and second power sources are in operation, outputs from both phase comparators 26 and 28 are connected through AND gate 39 to close XPC.

In a steady state condition of the system, the reference signal selector serves to apply an appropriate reference signal to the phase comparators 26 and 28. This is illustrated graphically in Table 2, supra.

Referring now to FIG. 2, the frequency and phase control for a power source is illustrated in detail. Engine 40 acts through constant speed drive 41 to turn generator 42, the output of which is connected through the switch GLC to the electric power distribution system. Typically, generator 42 has a field energized from a controlled source to regulate the output voltage. A permanent magnet generator (PMG) 43 is driven with generator 42 and provides a monitor output even in the absence of field excitation for generator 42. Both generators 42 and 43 provide inputs to the frequency and phase control circuitry. The 400 Hertz sine wave output of generator 42 is connected with a wave shaping circuit 45 which has a 400 Hertz square wave output. This signal is connected with a frequency divider 46 which has a 200 Hertz square wave output that is connected with frequency selector 47. The sine wave output of PMG 43 is connected with a wave shaping circuit 48 having a 400 Hertz square wave output and through a frequency divider 49 having a 200 Hertz square wave output with another input of frequency selector 47. The output of frequency selector 47, a 200 Hertz square wave, is one of the inputs of phase comparator 50. The signal from power generator 42 is provided to phase comparator 50 if the signal is present. In the event of absence of the signal, either through failure of the field excitation of generator 42 or a fault in wave shaping or divider circuits 45, 46, the signal from PMG 43 is utilized.

The 400 Hertz square wave from the output of wave shaping circuit 48 also provides a frequency control to the system. It is an input to one-shot multivibrator 52 which has alternate outputs at the terminals 52a, 52b connected with the positive and negative inputs of summing filter circuit 53. So long as the frequency of the signal is 400 Hertz, summing filter 53 has no output. If, however, the frequency should vary, an output siginal from the summing filter is applied through summing junction 54 and output amplifier 55 to constant speed drive 51 returning the system to a frequency of 400 Hertz. The frequency control portion of the system operates rapidly to minimize transient deviations in frequency.

An alternating current phase reference signal is provided by crystal oscillator 56 which may operate at any suitable harmonic of 400 Hertz. The output of crystal oscillator 56 is connected with frequency divider 57 which has a 200 Hertz square wave output. This signal provides the second input to phase comparator 50, either directly as shown or through reference signal selector 33, FIG. 1. Phase comparator 50 has two outputs 50a and 50b connected with the positive and negative inputs, respectively, of summing integrator 56. If the phase of the generator signal leads that of the reference signal, positive pulses at the output 50a are applied to the positive input of the summing integrator and if the generator phase lags, positive pulses at 50b are applied to the negative input of the summing integrator. The pulses have a width that is a function of the angle of phase error and a repetition rate of the frequency of the input signals of phase comparator 50. The output of the summing integrator is a DC voltage having a polarity which indicates cumulative phase lead or lag and an amplitude which represents the integrated phase error. It is applied as another input to summing junction 54 and through output amplifier 55 with constant speed drive 41. The current feedback for output amplifier 55 stabilizes the control circuit operation.

Figure 3:
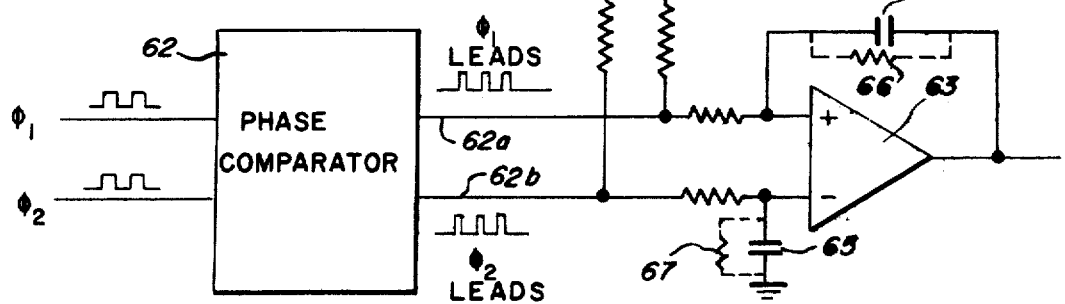
FIG. 3 is a circuit diagram of a phase comparator and summing integrator used in the system of FIG. 1.

FIG. 3 illustrates in more detail the circuit of the summing integrator and summing filter. Square wave signals $\phi 1$ and $\phi 2$ are connected as inputs with phase comparator 62 which has two outputs 62a and 62b. If signal $\phi 1$ leads, a series of positive pulses are present at output 62a with a pulse width which is a function of phase angle difference and a repetition rate which is a function of frequency. Conversely, if signal $\phi 2$ leads, a series of positive pulses are present at output 62b, again with a pulse width which represents the phase difference angle. Output 62a is connected with the positive input and output 62b with the negative input of a summing operational amplifier 63. The operational amplifier integrates the summed signal by virtue of feedback capacitor 64 connected from the amplifier output to the positive input and capacitor 65 connected from the negative input to ground. Thus, the signal at the output 66 of the summing amplifier is an integral of the sum of the pulses applied to the inputs and represents the cumulative difference in phase between the generated and reference signals. The summing integrator operates over any time period and the amplitude of the output is limited only by saturation of the operational amplifier. The summing integrator has an infinite time constant. A charge on the integrating capacitor is dissipated only by an input signal at the other input. Utilization of the cumulative phase difference signal, in combination with the frequency control signal, provides both frequency and phase regulation of the power source. The maintenance of substantial phase synchronism in the system enables the paralleling described above to be carried out with minimum voltage and current transients.

The summing filter which provides an instantaneous phase difference signal is similar to the summing integrator but has, in a simple first order configuration, resistors 66, 67 in parallel with capacitors 64, 65.

I claim:

1. In an electrical power generation and distribution system having a first electrical power source including a generator having an alternating current output, the generator being powered by a variable speed engine through a constant speed drive, a second electrical power source having an alternating current output and switch means for connecting the outputs of the two sources in parallel, a paralleling control comprising:
    means providing an alternating current phase reference signal, the phase of which corresponds with that of said second alternating current source;
    means for comparing the phase of the output of said first source generator with the phase of said reference signal;
    means responsive to the phase comparator for developing a cumulative phase difference signal which is connected with said constant speed drive to phase synchronize the first source generator with the reference signal; and
    means responsive to the phase comparator for actuating said switch means to connect the electrical source outputs in parallel, when the phase difference between the first source generator and the reference signal is within selected limits.

2. The paralleling control of claim 1 in which the means responsive to the phase difference signal for actuating said switch means is responsive to the cumulative phase difference signal.

3. The paralleling control of claim 1 in which the means responsive to the phase difference signal for actuating said switch means is responsive to the instantaneous phase difference between the generator and the reference.

4. The paralleling control of claim 1 in which said second source is an external power source and the reference signal is derived from the external power source.

5. The paralleling control of claim 1 in which said second source is a second generator having an alternating current output, powered by a second variable speed engine through a second constant speed drive and including means for comparing the phase of the output of the second source generator with the phase of a reference signal and means responsive to the second phase comparator for developing a cumulative phase difference signal representing the cumulative difference in phase between the output of the second source generator and the reference, which is connected with the second constant speed drive to synchronize the second source generator with the reference signal.

6. The paralleling control of claim 5 in which each of said first and second electrical power sources has means providing an alternating current reference signal and including means for selecting one of the reference signals for the phase comparator of both power sources.

7. An electrical power generation and distribution system, comprising:
    a first electrical power source including a generator having alternating current output, the generator being powered by a first variable speed engine through a first constant speed drive;
    a second electrical power source including a second generator having an alternating current output, the generator being powered by a second variable speed engine through a second constant speed drive;
    a third electrical power source including an external alternating current supply;
    a first phase control for the first power source, including means for comparing the phase of the output of the first generator with that of a reference signal, and means responsive to the phase comparator for developing a cumulative phase difference signal which is connected with the first constant speed drive to phase synchronize the first source with the reference signal;
    a second phase control for the second power source, including means for comparing the phase of the output of the second generator with that of a reference signal, and means responsive to the phase comparator for developing a cumulative phase difference signal which is connected with the second constant speed drive to phase synchronize the second source with the reference signal;

at least one source of alternating current phase reference signal associated with the first and second power sources;

a source of alternating current phase reference signal associated with the third power source;

a system for distributing electrical power from one or more of said sources to a load and including switch means operable independently for connecting each of the source outputs with the distribution system; and a paralleling control means for controlling the connection of a plurality of the power sources with the distribution system, including means for selecting one of the phase reference signals for the phase comparator of the first or second source connected or to be connected with the distribution system; and means responsive to the phase comparator for actuating said switch means to connect the electrical source outputs in parallel to the distribution system.

8. The electrical distribution system of claim 7 in which the phase reference signal is selected in accordance with the electrical power sources which are connected to and which are to be connected to said distribution system.

9. The electrical distribution system of claim 8 in which the external power source is connected to or is to be connected to the distribution system and in which a signal representing the phase of the external power source is selected as the reference signal.

10. The electrical distribution system of claim 8 including means for selecting a single reference signal for said phase comparator to control the phase of each generator following the paralleling operation.

11. The electrical distribution system of claim 10 in which said selection means selects the phase reference signal from the external source when the external source is connected with the system.

12. The electrical distribution system of claim 10 in which both the first and second phase controls include a source of alternating current phase reference signal and in which said selection means selects a phase reference signal from only one of the control sources when the external source is not connected with the system.

* * * * *